United States Patent
Lee et al.

(10) Patent No.: US 9,807,439 B2
(45) Date of Patent: Oct. 31, 2017

(54) METHOD FOR MANAGING CHANNEL AND ELECTRONIC DEVICE THEREFOR

(71) Applicant: Samsung Electronics Co., Ltd., Gyeonggi-do (KR)

(72) Inventors: Kwang-Jeung Lee, Gyeonggi-do (KR); Kyung-Chun Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/869,172

(22) Filed: Sep. 29, 2015

(65) Prior Publication Data

US 2016/0094865 A1 Mar. 31, 2016

(30) Foreign Application Priority Data

Sep. 29, 2014 (KR) .................. 10-2014-0130507

(51) Int. Cl.
*H04H 60/33* (2008.01)
*H04N 21/258* (2011.01)
*H04N 21/482* (2011.01)
*H04N 21/434* (2011.01)
*H04N 21/438* (2011.01)
*H04N 5/50* (2006.01)
*H04N 5/44* (2011.01)

(52) U.S. Cl.
CPC ......... *H04N 21/25841* (2013.01); *H04N 5/50* (2013.01); *H04N 21/4345* (2013.01); *H04N 21/4383* (2013.01); *H04N 21/482* (2013.01); *H04N 5/44* (2013.01)

(58) Field of Classification Search
None
See application file for complete search history.

(56) References Cited

U.S. PATENT DOCUMENTS

| | | | |
|---|---|---|---|
| 2005/0122429 A1* | 6/2005 | Katsube | H04H 20/26 348/555 |
| 2009/0133073 A1* | 5/2009 | DaLaCruz | H04N 5/44543 725/49 |
| 2010/0311399 A1* | 12/2010 | Cusick | H04N 5/44543 455/414.2 |

(Continued)

FOREIGN PATENT DOCUMENTS

| KR | 1999-023149 | 3/1999 |
|---|---|---|
| KR | 10-2009-0016114 | 2/2009 |

(Continued)

*Primary Examiner* — Jason K Lin
(74) *Attorney, Agent, or Firm* — The Farrell Law Firm, P.C.

(57) ABSTRACT

An electronic device and method thereof are provided. The electronic device includes a display; and a processor configured to control the display, wherein the processor is further configured to identify a condition for updating a channel, compare the condition for updating the channel to a predetermined condition, determine whether to update the channel based on a result of the comparison, and control the display to display information relating to updating the channel. The method includes identifying a condition for updating a channel; comparing the condition for updating the channel to a predetermined condition; determining whether to update the channel based on a result of the comparison; and displaying information relating to updating the channel.

14 Claims, 9 Drawing Sheets

(56) References Cited

U.S. PATENT DOCUMENTS

| | | | |
|---|---|---|---|
| 2012/0157025 A1 | 6/2012 | Seo et al. | |
| 2013/0111511 A1* | 5/2013 | Besehanic | H04N 21/482 725/14 |
| 2013/0185746 A1* | 7/2013 | Yang | H04N 21/25841 725/25 |
| 2014/0282699 A1* | 9/2014 | Fertig | H04N 21/231 725/32 |
| 2015/0181282 A1* | 6/2015 | Majid | H04N 21/4384 725/38 |
| 2015/0262245 A1* | 9/2015 | Arvanitis | G06Q 30/02 705/14.35 |

FOREIGN PATENT DOCUMENTS

| | | |
|---|---|---|
| KR | 10-2009-0130728 | 12/2009 |
| KR | 10-2011-0029703 | 3/2011 |
| KR | 10-2012-0068255 | 6/2012 |

\* cited by examiner

METHOD FOR MANAGING CHANNEL AND ELECTRONIC DEVICE THEREFOR

PRIORITY

This application claims priority under 35 U.S.C. §119(a) to a Korean Patent Application filed on Sep. 29, 2014 in the Korean Intellectual Property Office and assigned Serial No. 10-2014-0130507, the entire content of which is incorporated herein by reference.

BACKGROUND

1. Field of the Disclosure

The present disclosure generally relates to an electronic device, and more particularly, to a method for managing a channel and a device therefor.

2. Description of the Related Art

Different television (TV) channels may be used according to an area or a country. Recently, a mobile-enabled electronic device may be used for watching TV. An electronic device may receive a broadcast using a broadcasting service for a mobile terminal.

When a user moves to another area while receiving channel information using a mobile-enabled electronic device, the mobile-enabled electronic device may be unable to properly receive channel information according to a changed area due to different channel information according to each region. Further, when a user is located in a region in which signal strength is weak while receiving channel information, a mobile-enabled electronic device may be unable to properly receive the channel information. Accordingly, a mobile-enabled electronic device may be unable to recognize changed channel information, and the user may be unable to watch TV.

SUMMARY

When an electronic device is located in an area in which signal strength is weak while receiving channel information, the electronic device may be unable to properly receive the channel information and properly provide a TV service. In this case, since the electronic device has not received area channel information according to area movement, the electronic device should configure a channel list corresponding to the corresponding area. In this case, the electronic device requires a channel scan according to area movement, and requires time (e.g., seconds to minutes) for the channel scan to be performed.

An aspect of the present disclosure, provides an electronic device that may provide area movement information to a user, and may provide a preconfigured channel list according to a corresponding area.

Another aspect of the present disclosure provides an electronic device that may provide a channel list according to a corresponding area to a user without performing a channel scan.

Another aspect of the present disclosure provides an electronic device that may provide convenience to a user by providing seamless broadcasting information.

Another aspect of the present disclosure provides an electronic device that reduces power consumption by the electronic device by preventing an unnecessary location search.

Another aspect of the present disclosure provides an electronic device that reduces a standby time according to a channel scan by providing a channel list according to a corresponding area without the channel scan.

In accordance with an aspect of the present disclosure, an electronic device is provided. The electronic device includes a display; and a processor configured to control the display, wherein the processor is further configured to identify a condition for updating a channel, compare the condition for updating the channel to a predetermined condition, determine whether to update the channel based on a result of the comparison, and control the display to display information relating to updating the channel.

According to another aspect of the present disclosure, a method of an electronic device is provided. The method includes identifying a condition for updating a channel; comparing the condition for updating the channel to a predetermined condition; determining whether to update the channel based on a result of the comparison; and displaying information relating to updating the channel.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
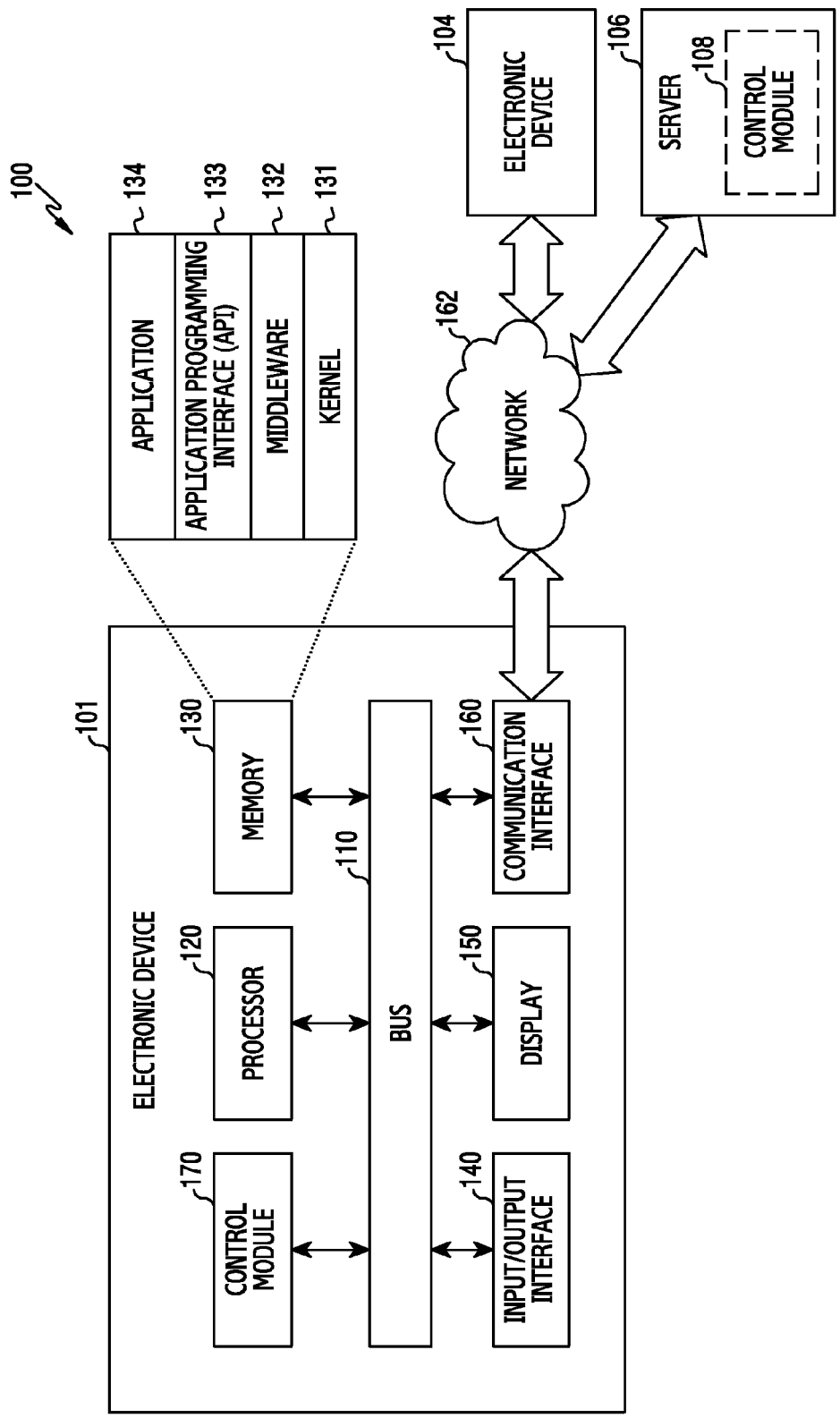
FIG. 1 is a block diagram of a network environment including an electronic device according to an embodiment of the present disclosure.

Hereinafter, various embodiments of the present disclosure are described with reference to the accompanying drawings.

The present disclosure may have various embodiments, and modifications and changes may be made therein. Therefore, the present disclosure will be described in detail with reference to embodiments shown in the accompanying drawings. However, it should be understood that the present disclosure is not limited to the embodiments shown in the accompanying drawings, but includes all modifications/changes, equivalents, and/or alternatives falling within the scope and spirit and the scope of the present disclosure, as defined by the appended claims and their equivalents. In describing the drawings, similar reference numerals may be used to designate similar elements.

As used to describe various embodiments of the present disclosure, the expressions "include" and "may include" refer to the existence of a corresponding function, operation, or element, but do not exclude one or more additional functions, operations, or elements. Further, as used to describe various embodiments of the present disclosure, the terms "include," "have," and their conjugates are intended merely to denote a certain feature, numeral, step, operation, element, component, or a combination thereof, but should not be construed to exclude the existence of, or a possibility of, the addition of one or more other features, numerals, steps, operations, elements, components, or combinations thereof.

Further, as used to describe various embodiments of the present disclosure, the expression "or" includes any or all combinations of words enumerated together. For example, the expression "A or B" may include A, B, or both A and B.

As used to describe various embodiments of the present disclosure, the expressions "first," "second," or the like may modify various elements in the present disclosure, but does not limit the sequence and/or importance of corresponding elements. The above expressions may also be used for the purpose of distinguishing one element from another element.

When an element is referred to as being "coupled" or "connected" to another element, it should be understood that the element may not only be coupled or connected directly to the other element, but a third element may also be interposed therebetween. In contrast, when an element is referred to as being "directly coupled" or "directly connected" to another element, it should be understood that no element is interposed therebetween.

The terms used to describe various embodiments of the present disclosure are used merely to describe a certain embodiment and are not intended to limit the present disclosure. As used herein, singular forms may include plural forms as well unless the context explicitly indicates otherwise. Further, all the terms used herein, including technical terms and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to an embodiment of the present disclosure may be a device including a communication function. The electronic device according to an embodiment of the present disclosure may, for example, include at least one of a smart phone; a tablet personal computer (PC); a mobile phone; a video phone; an e-book reader; a desktop PC; a laptop PC; a netbook computer; a personal digital assistant (PDA); a portable multimedia player (PMP); a moving picture experts group audio layer 3 (MP3) player; a mobile medical device; a camera; a wearable device (e.g., a head-mount-device (HMD) such as electronic glasses, electronic clothing, an electronic bracelet, an electronic necklace, an electronic appcessory, an electronic tattoo, or a smart watch); a television; a digital video disk (DVD) player; an audio player; a refrigerator; an air conditioner; a vacuum cleaner; an oven; a microwave oven; a washing machine; an air cleaner; a set-top box; a TV box (e.g., Samsung HomeSync™, Apple TV™, or Google TV™); a game console; an electronic dictionary; an electronic key; a camcorder; medical equipment (e.g., a magnetic resonance angiography (MRA) machine, a magnetic resonance imaging (MRI) machine, a computed tomography (CT) scanner, or an ultrasonic machine); a navigation device; a global positioning system (GPS) receiver; an event data recorder (EDR); a flight data recorder (FDR); an in-vehicle infotainment device; electronic equipment for a ship (e.g., ship navigation equipment and a gyrocompass); avionics; security equipment; an industrial or home robot; a part of furniture or a building/structure; an electronic board; an electronic signature receiving device; a projector; and various measuring instruments (e.g., a water meter, an electricity meter, a gas meter, or a wave meter), each of which includes a communication function. An electronic device according to an embodiment of the present disclosure may be a combination of one or more of the above-mentioned various devices. Further, it will be apparent to those skilled in the art that an electronic device according to an embodiment of the present disclosure is not limited to the above-mentioned devices.

Hereinafter, an electronic device according to an embodiment of the present disclosure is described with reference to the accompanying drawings. The term "user" as used to describe an embodiment of the present disclosure may indicate a person who uses an electronic device or a device (e.g., artificial intelligence electronic device) that uses an electronic device.

FIG. 1 is a block diagram of a network environment including an electronic device according to an embodiment of the present disclosure.

Referring to FIG. 1, the electronic device 101 may include at least one of a bus 110, a processor 120, a memory 130, an input/output interface 140, a display 150, a communication interface 160, and a control module 170.

The bus 110 may be a circuit that interconnects the above-mentioned elements and transmits communication signals (e.g., control messages) between the above-mentioned elements.

The processor 120 may, for example, receive commands from the above-mentioned other elements (e.g., the memory 130, the input/output interface 140, the display 150, the communication interface 160, and the control module 170) via the bus 110, interpret the received commands, and perform calculations or data processing according to the interpreted commands.

At least one processor 120 may be included in the electronic device 101 so as to perform predetermined functions of the electronic device 101. According to an embodiment of the present disclosure, the processor 120 may include at least one application processor (AP) and at least one micro controller unit (MCU). According to an embodiment of the present disclosure, the processor 120 may include at least one MCU as an application or may be functionally connected to at least one MCU. In FIG. 1, the AP and the MCU may be incorporated into one integrated circuit (IC) package or may be separately included in different IC packages. According to an embodiment of the present disclosure, one IC package may be implemented by including the MCU in the IC package of the AP. Although FIG. 1 shows the AP or MCU as being included as an element of the processor 120, this is merely an example for providing a better understanding of the present disclosure and it will be apparent that the processor 120 may serve as the AP and/or the MCU.

The AP may control a plurality of hardware or software components connected to the AP by driving an operating system or an application program (or application) and may process and calculate various data including multimedia data. The AP may, for example, be implemented as a system on chip (SoC). According to an embodiment of the present disclosure, the processor 120 may further include a graphics processing unit (GPU).

The MCU may be a processor configured to perform predetermined operations. According to an embodiment of the present disclosure, the MCU may acquire sensing information through at least one motion sensor (e.g., gyro sensor, acceleration sensor, or geomagnetic sensor), compare the acquired sensing information, and determine the operational state of the motion sensor by making reference to a database of the electronic device 101.

According to an embodiment of the present disclosure, the AP or the MCU may load a command or data received from at least one of a non-volatile memory and other elements connected to each of the AP and the MCU into a volatile memory and may process the loaded command or data. Further, the AP or the MCU may store data received from or generated by at least one other element in a non-volatile memory.

The memory 130 or 230 may store commands or data received from the processor 120 or other elements (e.g., the input/output interface 140, the display 150, the communication interface 160, and the control module 170) or generated by the processor 120 or other elements. The memory 130 may include programming modules, for example, a kernel 131, middleware 132, an application programming interface (API) 133, an application 134, and the like. Each of the above-mentioned programming modules may be implemented by software, firmware, hardware, or any combination thereof.

The kernel 131 may control or manage system resources (e.g., the bus 110, the processor 120, or the memory 130) that are used to perform operations or functions implemented in all the other programming modules, for example, the middleware 132, the API 133, or the application 134. Further, the kernel 131 may provide an interface through which the middleware 132, the API 133, or the application 134 can access each element of the electronic device 101 so as to control or manage the element.

The middleware 132 may act as an intermediary so as to allow the API 133 or the application 134 to communicate and exchange data with the kernel 131. Further, for operation requests received from the application 134, the middleware 132 may control the operation requests (e.g., perform scheduling or load balancing) using, for example, a method of prioritizing at least one application of the application 134 in using system resources (e.g., the bus 110, the processor 120, or the memory 130) of the electronic device 101.

The API 133 corresponds to an interface used by the application 134 to control a function provided by the kernel 131 or the middleware 132 and may, for example, include at least one interface or function (e.g., instruction) for controlling files, controlling windows, processing images, controlling texts, and others.

The applications 134 may include a short message service (SMS)/multimedia message service (MMS) application, an e-mail application, a calendar application, an alarm application, a health care application (e.g., an application for monitoring physical activity or blood glucose level), and an environmental information application (e.g., an application for providing atmospheric pressure, humidity, or temperature information). The application 134 may correspond to an application associated with information exchange between the electronic device 101 and an external electronic device (e.g. the electronic device 102 or the electronic device 104). The application associated with information exchange may, for example, include a notification relay application for notifying an external electronic device of certain information or a device management application for managing an external electronic device.

The notification relay application may, for example, include a function of transferring, to the electronic device 104, notification information generated by other applications (e.g., an SMS/MMS application, an e-mail application, a health management application, or an environmental information application) of the electronic device 101. Additionally or alternatively, the notification relay application may, for example, receive notification information from the electronic device 104 and may provide the received notification information to a user. The device management application may, for example, manage (e.g., install, delete, or update) functions for at least a part of the electronic device 104 communicating with the electronic device 101 (e.g., a function of turning on/off the electronic device 104 (or some components thereof) or a function of adjusting the brightness (or resolution) level of the display), applications operated in the electronic device 104, or services (e.g., a telephone call service or a message service) provided by the electronic device 104.

According to an embodiment of the present disclosure, the application 134 may include an application that is specified according to the attributes (e.g., the type of electronic device) of the electronic device 102 or the electronic device 104. For example, when an external electronic device is an MP3 player, the application 134 may include an application associated with music playback. Likewise, when an external electronic device is a mobile medical appliance, the application 134 may include an application associated with health care. According to an embodiment of the present disclosure, the application 134 may include at least one of an application specified for the electronic device 101 and an application received from an external electronic device (e.g., the server 106 or the electronic device 104).

The input and output interface 140 may transmit instructions or data input by a user through an input and output device (for example, a sensor, a keyboard or a touch screen) to the processor 120, the memory 130, the communication interface 160, or the control module 170 through the bus 110, for example. For example, the input and output interface 140 may provide data on a user's touch input through a touch screen to the processor 120. In addition, the input and output interface 140 may output instructions or data received from the processor 120, the memory 130, the communication interface 160, or the control module 170 through the bus 110 through the input and output device (for example, a speaker or a display). For example, the input and output interface 140 may output voice data processed through the processor 120 to the user through a speaker.

The display 150 may display a variety of information (for example, multimedia data, text data, and the like) for the user.

The communication interface 160 may establish communication between the electronic device 101 and an external device (for example, an electronic device 104 or a server 106). For example, the communication interface 160 may be connected to a network 162 via wireless communication or wire communication to communicate with an external device. The wireless communication may include at least one of wireless fidelity (WiFi), Bluetooth (BT), near field communication (NFC), cellular communication (for example, long term evolution (LTE), LTE advanced (LTE-A), code division multiple access (CDMA), wideband CDMA (WCDMA), universal mobile telecommunications system (UMTS), wireless broadband (WiBro), global system for mobile communication (GSM), and the like), or Infrared Data Association (IrDA). The wire communication may include at least one of a universal serial bus (USB), a high definition multimedia interface (HDMI), a recommended standard 232 (RS-232), or plain old telephone service (POTS).

The external device 104 may perform a channel control function by communicating with the electronic device 101. A communication unit of the external device 104 may be electrically connected to the electronic device 101 through the communication interface 160 of the electronic device 101. Data collected by the external device 104 may be transmitted to the electronic device 101 through a communication module, and the data may be transferred from the electronic device 101 to the external device 104 through the communication module. The external device 104 may transmit and receive an interface to/from the electronic device 101 and, when the external device 104 and the electronic device 101 are connected, a lens unit of the external device 104 is located before the display 150 so that an image provided by the display 150 of the electronic device 101 may be provided to a user.

The control module 170 may process at least some pieces of information acquired from other components (for example, the processor 120, the memory 130, the input/output interface 140, or the communication interface 160), and may provide the processed pieces of information to a user through various methods. For example, the control module 170 may process sensor information collected through the processor 120 or sensor information collected by the external device 104. A control module 108 may be included in the electronic device 101, and may be included in the external electronic device 104.

Figure 2:
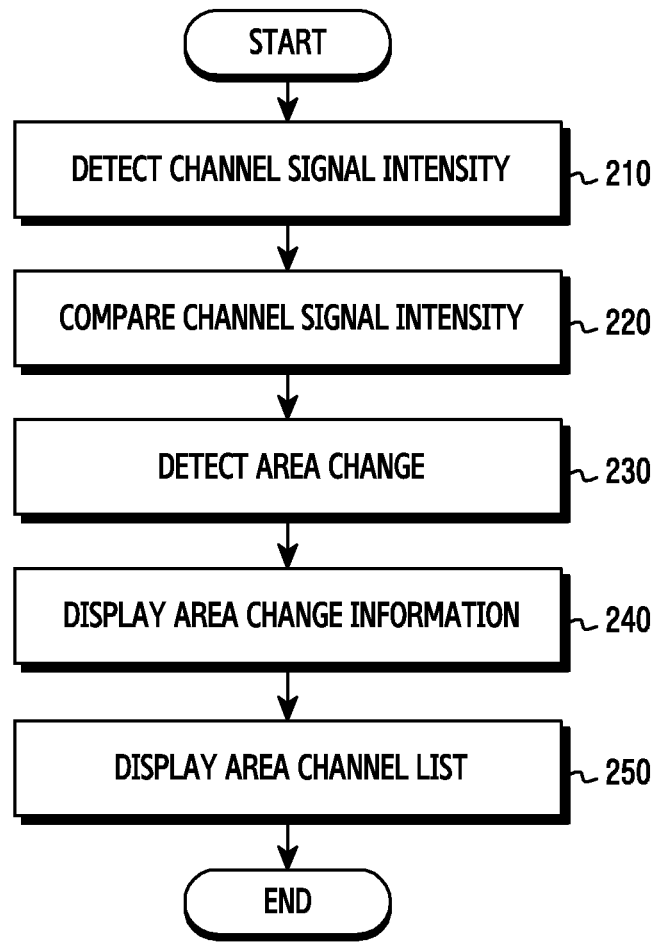
FIG. 2 is a flowchart of a method of displaying a channel list according to an area change according to an embodiment of the present disclosure.

FIG. 2 is a flowchart of a method for providing channel information according to an embodiment of the present disclosure.

Referring to FIG. 2, the electronic device detects a signal strength of a channel signal in operation 210. The electronic device can detect a signal strength of a channel signal by receiving information on a signal to noise ratio (SNR), a received signal strength indication (RSSI), or the like.

The electronic device may compare a signal strength of a channel signal with a reference value in operation 220. The electronic device may detect a signal strength of a channel signal and then compare the signal strength of the channel signal with a configured reference value, continuously perform an operation for detecting the signal strength of the channel signal in operation 210 when the signal strength of the channel signal is higher than the reference value, and proceed to operation 230 in which the electronic device detects location information when the signal strength of the channel signal is lower than the reference value or belongs to a predetermined range. Further, the electronic device may perform an operation for detecting location information by detecting an execution of a function, a change of a channel and the like.

Additionally, in case of a Sistema Brasileiro de TV Digital Terreste (SBTVD) or integrated services digital broadcasting terrestrial (ISDB-T) standard, when a user receives FullSeg channel information and the signal strength of the channel signal is lower than the reference value, the electronic device may detect whether a OneSeg channel on which the same broadcast can be maintained exists, and when the OneSeg channel on which the same broadcast can be maintained exists, the electronic device may provide seamless channel information by automatically being connected to the corresponding OneSeg channel. When a One-Seg channel does not exist, the electronic device may proceed to operation 230 in which the electronic device detects location information.

The electronic device may detect an area change in operation 230. The electronic device may detect location information, and may detect an address through location information and then determine that an area has been changed when there is a change in a particular address. The location information may be stored in the electronic device or another electronic device connected to the electronic device, for example, a wearable device. Alternatively, the electronic device may switch over to a channel identical to or similar to another channel before an area change without displaying an area channel list.

The electronic device may display area change information in operation 240. When the electronic device determines that an area has been changed in operation 230, the electronic device may provide a display indicating the area has been changed to a user. When the electronic device includes an area channel list for a changed area, the electronic device may provide a display indicating whether to display a channel list of a corresponding area, and when the electronic device does not include the channel list of the corresponding area, the electronic device may provide a display indicating whether to scan a channel again to a user. Alternatively, the electronic device may automatically perform a scan without asking a user whether to scan a channel again while displaying area information according to a configuration. Alternatively, the electronic device may automatically perform a scan without asking a user whether to scan a channel again while not displaying area change information according to a configuration.

In operation 250, the electronic device may display an area channel list. The electronic device may display a channel list of a changed area when the channel list information of the changed area is stored, and may scan an area channel list and then display the channel list of the changed area when the channel list information of the changed area is not stored. The channel list information of the area may be stored in the electronic device or another electronic device connected to the electronic device, for example, a wearable device. Alternatively, operation 250 may be omitted according to a configuration.

According to an embodiment of the present disclosure, when an area has been changed, if a channel identical to or similar to a current viewing (reproducing) channel and the channels of the changed area exists, the electronic device may automatically switch over to the corresponding channel without displaying an area channel list. For example, the electronic device may determine whether a channel identical to or similar to a network information table (NIT) for a channel being viewed by a user exists in a channel list, and may automatically switch over to a corresponding channel by extracting the corresponding channel information when the channel identical to or similar to the NIT for the channel being viewed by the user exists.

Figure 3:
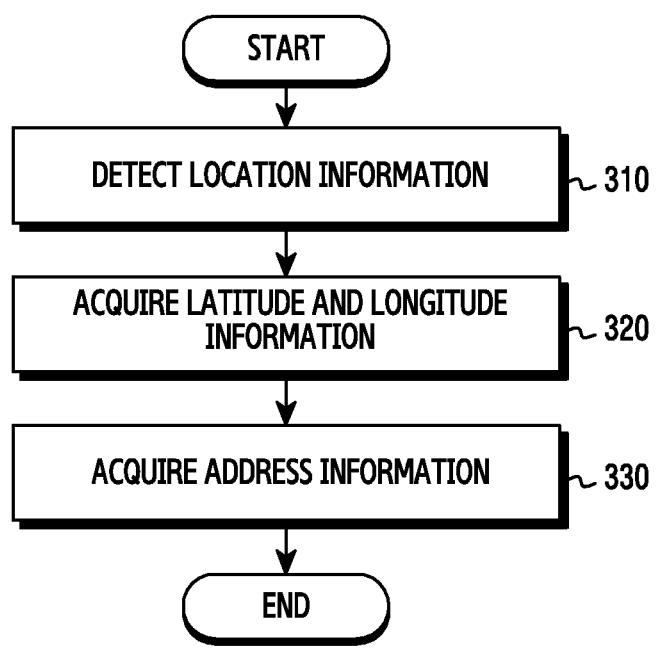
FIG. 3 is a flowchart of a method of acquiring area information (e.g. address information) according to an embodiment of the present disclosure.

FIG. 3 is a flowchart of a method for acquiring area information according to an embodiment of the present disclosure.

Referring to FIG. 3, the electronic device may detect location information in operation 310. The location information may be detected through a connection to a global positioning system (GPS) or a wireless network. The electronic device may determine whether a function of an embedded GPS is activated, or may determine whether GPS information can be received through an external device. When it is determined that the electronic device can be connected to the GPS, the electronic device may acquire latitude and longitude information in operation 320, and when it is determined that the electronic device cannot be connected to the GPS, the electronic device may detect a connection to a wireless network.

According to an embodiment of the present disclosure, when the electronic device detects a connection to a wireless network, the electronic device may detect location information through information provided by a service provider of the wireless network. The electronic device may acquire information provided by a wireless network provider. When the electronic device is connected to a wireless network, the electronic device may acquire information provided by a wireless network provider, for example, a mobile country code (MCC), a mobile network code (MNC), a location area code (LAC), a cell identification (ID), wireless fidelity access point (WiFi AP) information and the like.

In operation 320, the electronic device may acquire latitude and longitude information. The electronic device may acquire the latitude and longitude information through a connection to the GPS in operation 310, or may acquire the latitude and longitude information through the MCC, the MNC, the LAC and the Cell ID which have been collected through a connection to the wireless network or location information received through the WiFi information.

In operation 330, the electronic device may acquire address information through the latitude and longitude information which have been acquired in operation 320. The electronic device may extract address information through information included in the latitude and longitude information. For example, the electronic device may acquire information on an area through a code included in latitude and longitude information. The electronic device may detect an area information code according to latitude and longitude, and may detect in which area the electronic device is located according to each digit of the code.

Figure 4:
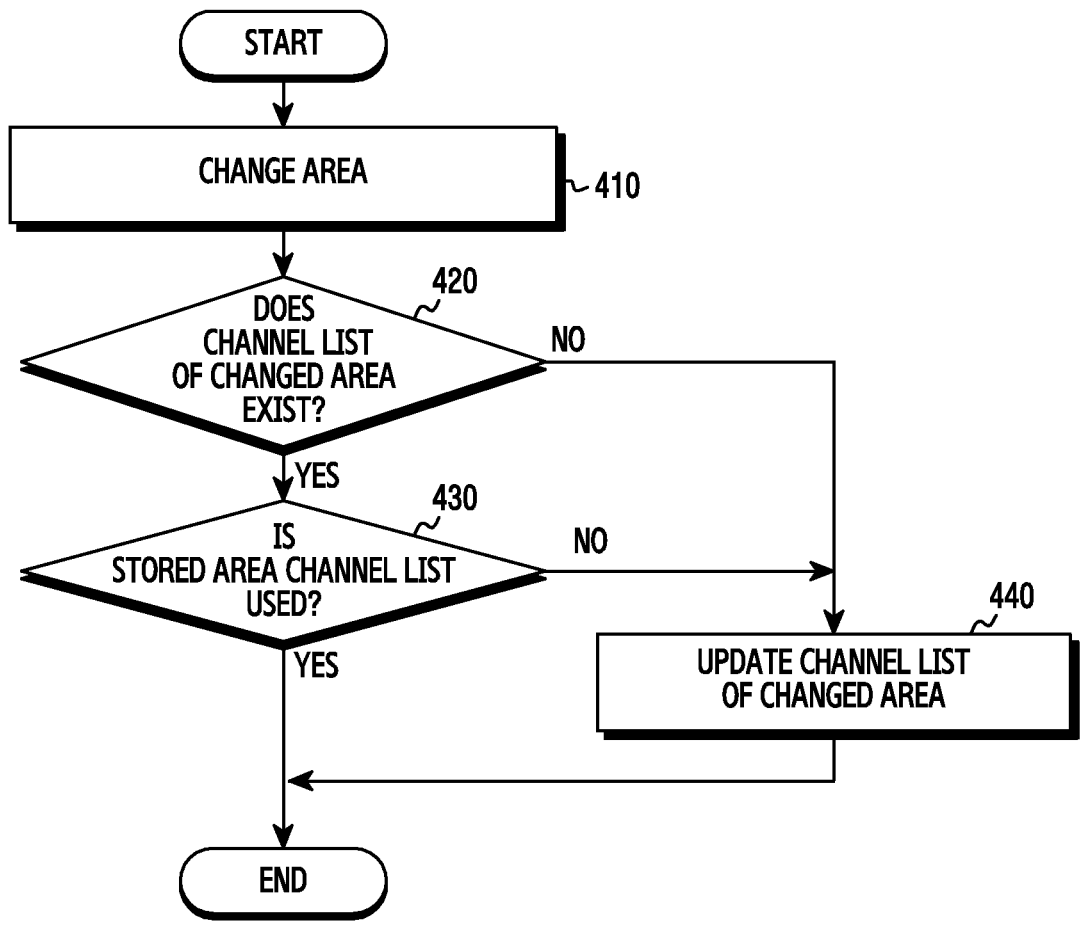
FIG. 4 is a flowchart of a method of providing channel information according to an embodiment of the present disclosure.

FIG. 4 is a flowchart of a method for providing channel information according to area movement according to an embodiment of the present disclosure.

Referring to FIG. 4, the electronic device may detect an area change in operation 410. The electronic device may detect an area information code through the latitude and longitude which have been acquired in operation 320 of FIG. 3, and may determine that an area has been changed when there is a change in a digit (or a code) of a certain code. When the electronic device determines an area change, which digit of a code will be detected may be different according to a specification of a digital TV, and a country. An area code can be defined by Table 1 below.

TABLE 1

| country name | Admin area | sub admin area | Locality | sub locality |
|---|---|---|---|---|
| South Korea | Gyeonggi-do | — | Suwon-si | Yeongtong-gu |
| South Korea | Seoul | — | Gangnam-gu | — |
| Brazil | State of Rio de Jaeneiro | Rio de Janeiro | Rio de janeiro | Praca da Bandeira |
| Brazil | Sao Paulo | Sao Paulo | — | Bela Vista |
| Brazil | Sao Paulo | Campinas | — | Vila Itapura |
| Peru | Lima | Lima | La Victoria | Santa Catalina |
| Peru | La Libertad | Trujillo | Trujillo | Centro Historico |

Referring to Table 1 above, an area code may include, for example, a country name, an administration area, a sub administration area, and locality and sub locality information. The electronic device may determine whether to perform area movement on the basis of a field of Table 1 above according to a specification of a TV, and a country. For example, in the case of South Korea, the electronic device may determine whether a corresponding area belongs to a capital area or the whole country using the administration area code from among area information codes, and, in the case of Brazil, the electronic device may detect area change information using a sub administration area code. More specifically, in the case of Brazil, since a channel relating to a specification of SBTVD is different according to each city, it can be determined whether area movement is performed according to the sub administration area field of Table 1 above. For another example, in the case of digital multimedia broadcasting (DMB) of South Korea, since channels are divided into channels belonging to the capital area and channels belonging to the whole country, it can be determined whether area movement is performed on the basis of the administration area field of Table 1 above. When the electronic device determines that an area has not been changed, the electronic device may continuously perform an operation of detecting location information, and when the electronic device determines that the area has been changed, the electronic device may proceed to operation 420 and detect whether a stored channel list exists.

In operation 420, the electronic device may determine whether a channel list of a changed area (or a stored channel list) exists. When there is a change in an area to which the electronic device belongs, the electronic device may detect whether a stored channel list exists for channel information of the changed area. For example, as shown in Table 2 below, a channel list excluding area information is stored.

TABLE 2

| Channel number | Channel |
|---|---|
| Ch18 | Globo HD video pid = 100, audio pid = 101 |
| Ch18 | Globo 1seg video pid = 102, audio pid = 103 |
| Ch22 | Canal21 HD video pid = 201, audio pid = 202 |
| Ch22 | Canal21 1seg video pid = 204, audio pid = 204 |

In Table 2 above, "pid" denotes a program identification code. The channel list may include a channel number, a channel name, and video pid and audio pid information.

In the case of a channel list like Table 2 above, which does not include area information, the electronic device receives existing channel information regardless of an area even when the area in which the electronic device is located has been changed. Therefore, channel disconnection may occur. However, as shown in Table 3 below, when a channel list including area information is stored, the electronic device may not need to search for channel information of a corresponding area according to area movement again.

TABLE 3

| Area name | Channel number | Channel |
|---|---|---|
| Sao Paulo | Ch18 | Globo HD video pid = 100, audio pid = 101 |
| | Ch18 | Globo 1seg video pid = 102, audio pid = 103 |
| | Ch22 | Canal 21 HD video pid = 201, audio pid = 202 |
| | Ch22 | Canal 21 1seg video pid = 203, audio pid = 204 |
| Rio De Janeiro | Ch21 | Globo HD video pid = 500, audio pid = 501 |
| | Ch21 | Globo 1seg video pid = 502, audio pid = 503 |
| | Ch30 | Canal21 HD video pid = 201, audio pid = 202 |
| | Ch30 | Canal21 1seg video pid = 203, audio pid = 204 |
| Brazilia | Ch60 | Globo HD video pid = 300, audio pid = 301 |
| | Ch60 | Globo 1seg video pid = 302, audio pid = 303 |
| | Ch18 | Canal 21 HD video pid = 401, audio pid = 402 |

TABLE 3-continued

| Area name | Channel number | Channel |
|---|---|---|
| | Ch18 | Canal 21 1seg video pid = 403, audio pid = 404 |
| Campinas | Ch30 | Globo HD video pid = 500, audio pid = 501 |
| | Ch30 | Globo 1seg video pid = 502, audio pid = 503 |
| | Ch31 | Canal 21 HD video pid = 101, audio pid = 102 |
| | Ch31 | Canal 21 1seg video pid = 103, audio pid = 104 |

When the electronic device includes a channel list in which area information like Table 3 above is stored, the electronic device may proceed to operation 430, i.e. an operation of determining whether to use a stored area channel list. When the electronic device does not include a channel list in which area information like Table 3 above is stored, or when the electronic device does not include channel information on an area in which the electronic device is located although the channel list in which the area information like Table 3 above is stored exists, the electronic device may proceed to operation 440 and then update channel information on a corresponding area.

When a channel list of a changed area exists, the electronic device may determine whether to use a previously stored channel list in operation 430. As the electronic device detects an area change, the electronic device may provide a display indicating whether to use the previously stored channel list. When a user uses the previously stored channel list, the electronic device may display an area channel list corresponding to an area in which the user is currently located. When a user does not use the previously stored channel list, the electronic device may perform a channel scan. The above-described operation according to an embodiment of the present disclosure may be performed according to a selection of a user. For example, the electronic device may or may not use the previously stored channel list according to the selection of the user.

When a channel list of a changed area does not exist, the electronic device may update a channel list of a corresponding area in operation 440. The electronic device may update information of a channel list for the corresponding area through a channel scan for the corresponding area and then store the updated information in channel list information. The stored channel list information may be used later when the electronic device is located in the corresponding area. The electronic device may acquire information on the corresponding area channel without a separate scan process thereafter. The above-described operation according to an embodiment of the present disclosure may be performed according to a selection of a user. For example, the electronic device may or may not update a channel list according to the selection of the user.

According to an embodiment of the present disclosure, when an area has been changed, if a channel identical to or similar to a current viewing (reproducing) channel and the channels of the changed area exists, the electronic device may automatically switch over to a corresponding channel. For example, the electronic device may determine whether a channel identical to or similar to the NIT for a channel being viewed by a user exists in a channel list, and may automatically switch over to a corresponding channel by extracting the corresponding channel information when the channel identical to or similar to the NIT for the channel being viewed by a user exists.

Figure 5A:
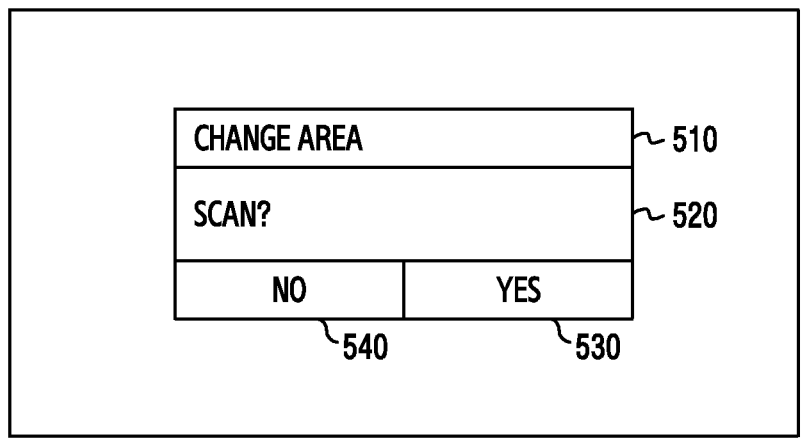
FIGS. 5A and 5B illustrate screen configurations of an electronic device according to an area information change according to an embodiment of the present disclosure.
Figure 5B:
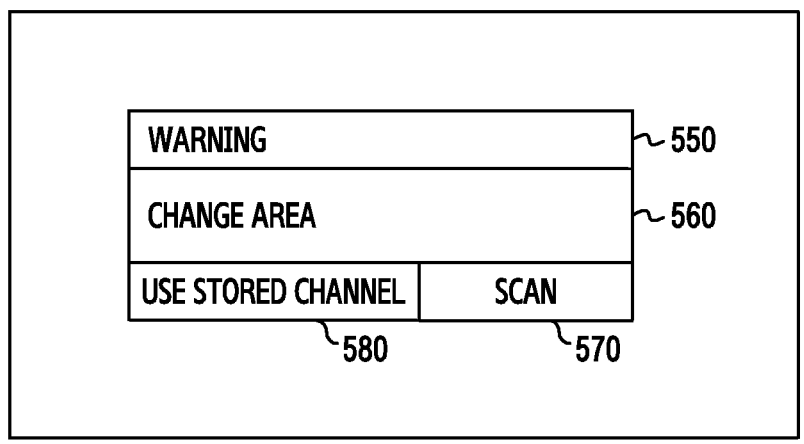

FIGS. 5A and 5B illustrate screen configurations of an electronic device according to area information change according to an embodiment of the present disclosure.

Referring to FIG. 5A, an example of a screen is illustrated that is displayed when an area of the electronic device has been changed and a channel list of a corresponding area does not exist in a channel list stored in the electronic device. According to an embodiment of the present disclosure, when a location of the electronic device has been changed, the electronic device detects an area change, and when the electronic device checks a stored channel list and a channel list for a corresponding area does not exist in the stored channel list, the electronic device may display a user interface (UI) 510 marked "CHANGE AREA" on a screen, and may display UIs 520, 530 and 540 asking a user whether to perform channel information search for acquiring channel information. When a user chooses to perform a channel search (for example, when choosing the UI 530), the electronic device may perform the channel search and then update a searched channel list. Alternatively, when a user chooses not to perform a channel search (for example, when choosing the UI 540), the electronic device can store a current channel list in a channel list of an area in which the user is located. When a user does not want a scan, the electronic device may store a current channel list as a channel list of a change area.

Referring to FIG. 5B, an example of a screen is illustrated that is displayed when an area of the electronic device has been changed and a list of the corresponding area exists. According to an embodiment of the present disclosure, when a location of the electronic device has been changed, the electronic device detects an area change, and when the electronic device checks a stored channel list and a channel list for a corresponding area exists in the stored channel list, the electronic device may display UIs 550 and 560 marked "WARNING" or "CHANGE AREA," respectively, on a screen, and may display UIs 570 and 580 asking a user whether to use a channel list for a stored corresponding area. When a user chooses to use the channel list for the stored corresponding area (for example, when choosing the UI 580), the electronic device may display the channel list for the stored corresponding area without a scan. The electronic device may use a channel list for a stored corresponding area or may not perform a scan according to a selection of a user.

Alternatively, when a channel is updated, the electronic device may automatically switch over to a channel relating to an existing channel being viewed by a user, or may display a menu enabling a user to choose whether to perform automatic switching. The menu enabling a user to choose whether to perform automatic switching may be switched on/off according to a designation of the user.

Figure 6:
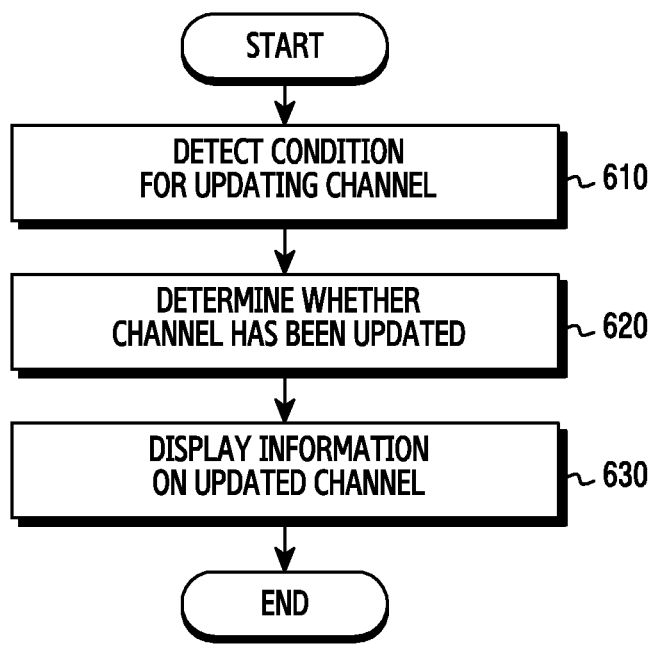
FIG. 6 is a flowchart of a method of providing channel information according to an embodiment of the present disclosure.

FIG. 6 is a flowchart of a method for providing channel information according to an embodiment of the present disclosure.

Referring to FIG. 6, the electronic device may detect a condition for updating a channel in operation 610. A condition for updating the channel may include at least one condition from among a change in signal strength, a change in a location, an execution of a function, and a channel change. When the electronic device detects the signal strength of the channel, the electronic device may detect a signal strength of a channel signal by receiving information such as a SNR or RSSI and then compare the signal strength of the channel signal with a reference value. The electronic device may detect a signal strength of a channel signal and then compare the signal strength of the channel signal with a configured reference value, and may detect location information when the signal strength of the channel signal is lower than the reference value or belongs to a configured range. When the electronic device receives information on an ISDB-T or SBTVD and a signal strength of a channel signal is lower than a reference value, the electronic device may change a FullSeg channel into a OneSeg channel.

The electronic device may determine whether to update a channel in operation 620. According to an embodiment of the present disclosure, the electronic device may perform a channel update when a location change is detected. The method for detecting location change may include a method for acquiring location information through a GPS and a method for acquiring the location information through information provided by a wireless network provider. When the electronic device uses the wireless network information, the electronic device may use a MCC, a MNC, a LAC, a Cell ID, and WiFi information. The electronic device detects location information, and detects an address through location information and then determines that an area has been changed when there is a change in a particular address. When the electronic device determines whether to change an area, the location change may be detected through address information. Further, the address information may include a plurality of address areas, and the detecting of the location change may determine the location change while varying the address areas used according to a specification of a country, or a television (TV).

According to an embodiment of the present disclosure, the electronic device may determine whether to display a channel list corresponding to a changed location or switch over to a channel of the changed location corresponding to a channel being viewed by a user when a location change is detected, and may perform a channel scan to update a channel list when the electronic device does not include a channel list corresponding to the changed location. Further, the electronic device may update a channel list into the corresponding channel list when the electronic device includes the channel list.

The electronic device may display information on an updated channel in operation 630. The electronic device may provide a channel list of a changed area to a user, or may scan channels of a corresponding area and then store a result of the scan so as to provide (e.g. display) the scanned channel list to the user when the electronic device does not store the channel list of the changed area. The stored channel result may be used as an area channel list when an area is changed later. Alternatively, the electronic device may automatically provide an identical channel or a similar channel corresponding to a channel being viewed by a user without providing area change or channel list information to a user.

According to an embodiment of the present disclosure, a method of an electronic device may include identifying a condition for updating a channel; comparing the condition for updating the channel with a predetermined condition; determining whether to update the channel on the basis of a result of the comparison; and displaying information relating to the updating of the channel.

According to an embodiment of the present disclosure, detecting the condition for updating the channel may include detecting at least one of a change in signal strength, a change in a location of the electronic device, an execution of a function, and a channel change.

According to an embodiment of the present disclosure, detecting the condition for updating the channel may detect at least one of a change in signal strength, an execution of a function, or a channel change, and may include detecting a location change of the electronic device when the detected condition satisfies the predetermined condition.

According to an embodiment of the present disclosure, detecting the condition for updating the channel may include detecting the location change on the basis of address information.

According to an embodiment of the present disclosure, the address information may include at least one address area, and detecting the location change may determine the location change while varying the address area according to a specification of a country or a TV.

According to an embodiment of the present disclosure, the information relating to the updating of the channel may include at least one piece of information among information indicating whether a channel scan has been performed and the location change of the electronic device.

According to an embodiment of the present disclosure, the operation method may further include, when a location of the electronic device is changed so that a channel is updated, switching of a channel, which is being reproduced, to a channel corresponding to the changed location.

According to an embodiment of the present disclosure, the method may further include, when a list for channels corresponding to the changed location is not included, scanning and updating of the channel list.

According to an embodiment of the present disclosure, the method may further include, when a list for channels corresponding to the changed location is included, updating of a channel list corresponding to the changed location.

According to an embodiment of the present disclosure, the method may further include, when a user does not want the updating of the channel list, maintaining of a current channel list.

According to an embodiment of the present disclosure, the method may further include storing of a channel list which has been updated through a scan of the channel list.

Figure 7:
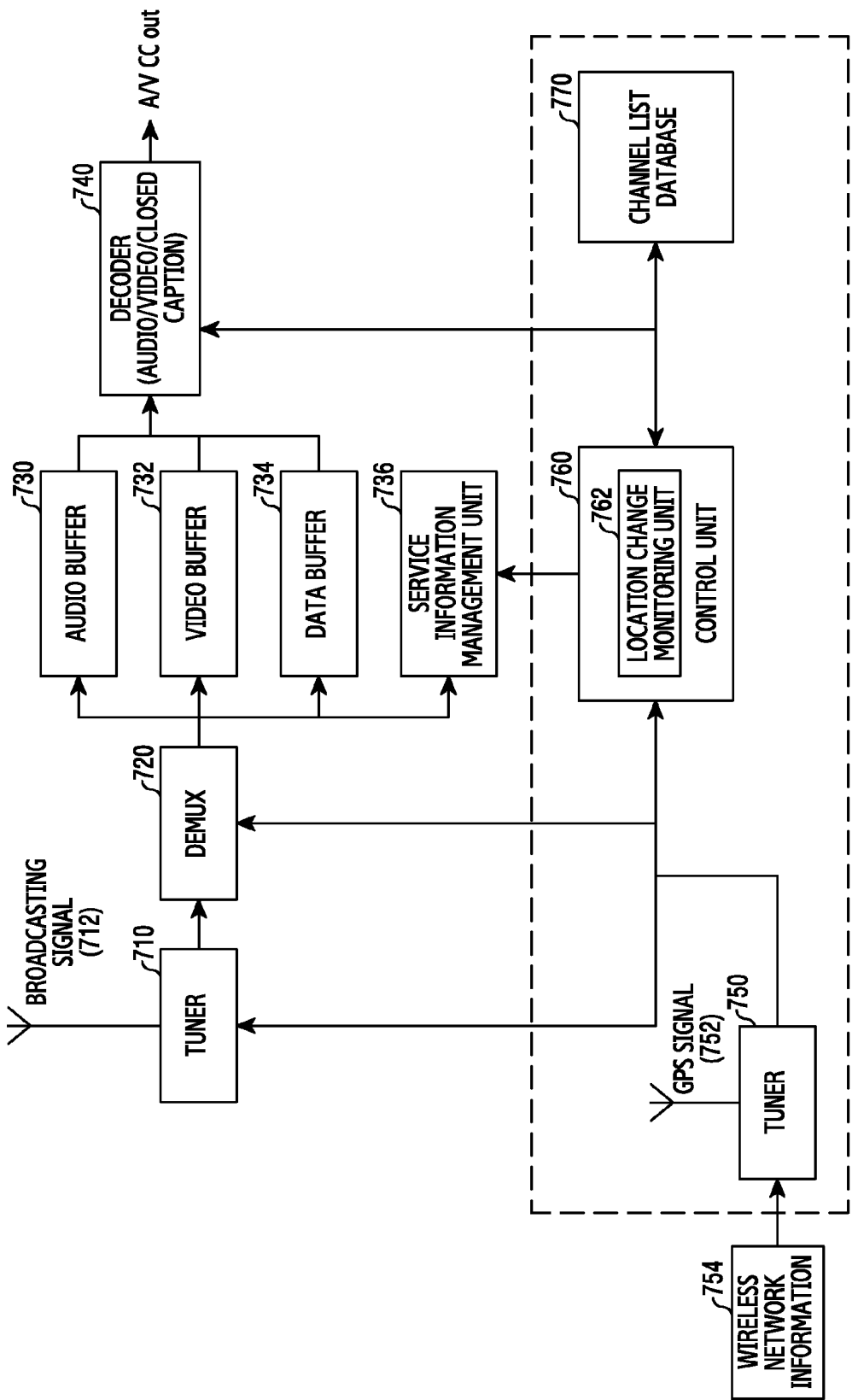
FIG. 7 is a block diagram of an electronic device according to an embodiment of the present disclosure.

FIG. 7 is a block diagram of an electronic device according to an embodiment of the present disclosure.

Referring to FIG. 7, an electronic device may include a first tuner 710, a demultiplexer (or DEMUX) 720, an audio buffer 730, a video buffer 732, a data buffer 734, a service information management unit 736, a decoder 740, a second tuner 750, a control unit 760, and a channel list database 770.

The first tuner 710 may be tuned to a center frequency of a broadcasting channel which the first tuner 710 is to receive. In a TV signal, a frequency is allocated to each channel, and a user should select a frequency of a corresponding channel in order to receive a broadcasting signal of a specific channel. Therefore, the electronic device may receive a signal of a frequency by performing tuning through a tuner. Especially, the second tuner 750 according to an embodiment of the present disclosure may perform tuning to channel information on an area in which the electronic device is located by acquiring a GPS signal 752 and wireless network information 754.

The DEMUX 720 may classify received signals. The DEMUX 720 may receive information such as audio/video/closed caption/service information (SI) through the first tuner 710 and the second tuner 750. The information may be received in a state of being multiplexed (or muxed). In case of the above-described data received in a state where a couple of information is muxed, the DEMUX 720 may detect a signal only when the DEMUX 720 classifies the data as each piece of information or data. The DEMUX 720 may classify each piece of received data. For example, the DEMUX 720 may classify audio by audio, and can classify video by video.

Each of the audio buffer 730, video buffer 732 and data buffer 734 may store classified data through the DEMUX

720. For example, the audio buffer 730 may store classified audio data through the DEMUX 720, the video buffer 732 may store classified video data through the DEMUX 720, and the data buffer 734 may store classified data through the DEMUX 720.

The service information management unit 736 may manage service information of data. The service information management unit 736 may manage the SI from among pieces of data classified through the DEMUX 720. The SI may include a table for broadcasting, such as a program allocation table (PAT), a program map table (PMT) and a network information table (NIT), and an event information table (EIT) for an electronic program guide (EPG) and the like.

The decoder 740 may perform decoding for compressed data. The decoder 740 may perform decoding for compressed and buffered data. The decoder 740 may respectively perform audio compression algorithm-based decoding for audio and video compression algorithm-based decoding for video, and may generate data for displaying and outputting on a screen or a speaker. The decoder 740 may also extract a text from a closed caption in accordance with a closed caption standard.

The control unit 760 may perform controlling and managing of all modules such as the first tuner 710, the DEMUX 720, the audio buffer 730, the video buffer 732 and the data buffer 734, the service information management unit 736 and the decoder 740. Further, the control unit 760 may include a location change monitoring unit 762. The location change monitoring unit 762 may determine whether location change information has been changed by acquiring location information of the electronic device.

The channel list database 770 may store a scanned channel list. Especially, according to an embodiment of the present disclosure, the channel list database 770 may provide a channel list according to a changed area by storing a channel list according to an area when the area of the electronic device is changed.

According to an embodiment of the present disclosure, an electronic device includes a display; and a processor for controlling the display, wherein the processor may identify a condition for updating a channel, compare the condition for updating the channel with a predetermined condition, determine whether to update the channel on the basis of a result of the comparison, and display information relating to the updating of the channel through the display.

According to an embodiment of the present disclosure, the condition for updating the channel may include at least one of a change in signal strength, a change in a location of the electronic device, an execution of a function, or a channel change.

According to an embodiment of the present disclosure, the processor may detect at least one of a change in signal strength, an execution of a function, or a channel change, and may detect a location change of the electronic device when the detected condition satisfies the predetermined condition.

According to an embodiment of the present disclosure, the processor may detect the location change on the basis of address information.

According to an embodiment of the present disclosure, the address information may include at least one address area, and the processor may determine the location change while varying the address area according to a specification of a country or a TV.

According to an embodiment of the present disclosure, information relating to the updating of the channel may include at least one piece of information among information indicating whether a channel scan has been performed or a location change.

According to an embodiment of the present disclosure, when a location of the electronic device is changed so that a channel is updated, the processor may switch a reproducing channel to the channel corresponding to the changed location.

According to an embodiment of the present disclosure, when the processor does not include a channel list corresponding to the changed location, the processor may scan and update the channel list.

According to an embodiment of the present disclosure, when the processor includes a channel list corresponding to the changed location, the processor may update the channel list corresponding to the changed location.

According to an embodiment of the present disclosure, when a user does not want the updating of the channel list, the processor can maintain a current channel list.

Figure 8:
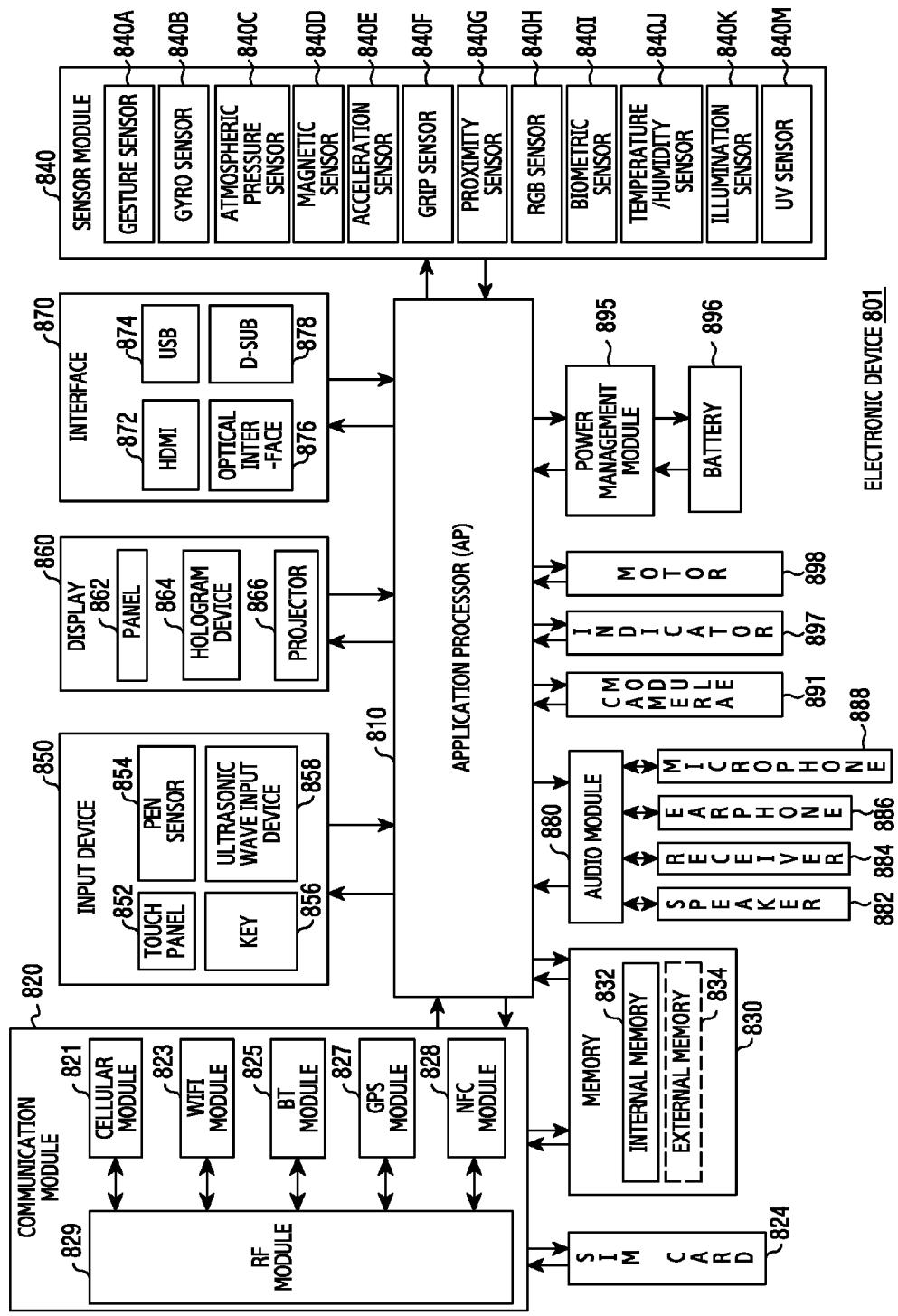
FIG. 8 is a block diagram of an electronic device according to an embodiment of the present disclosure.

FIG. 8 is a block diagram of an electronic device 801 according to various exemplary embodiments. The electronic device 801 may configure the entirety or part of the electronic device 101 shown in FIG. 1.

Referring to FIG. 8, the electronic device 801 may include one or more application processors (APs) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, or a motor 898.

The AP 810 may control a plurality of hardware or software elements connected to the AP 810 by driving an operating system or an application program, and may process and calculate a variety of data including multimedia data. For example, the AP 810 may be implemented by using an SoC. According to an exemplary embodiment, the AP 810 may further include a GPU.

According to an embodiment of the present disclosure, the AP 810 may determine that an area has been changed when a signal strength of the channel signal is lower than the reference value. Also, the AP 810 may change a FullSeg channel into a OneSeg channel when the signal strength of a channel signal is lower than a reference value. The method for detecting area change may include a method for acquiring location information through a GPS and a method for acquiring the location information through information provided by a wireless network provider. When the electronic device uses the wireless network information, the electronic device may use a MCC, a MNC, a LAC, a Cell ID, and WiFi information.

The communication module 820 (for example, the communication interface 160) may transmit and receive data via communication between the electronic device 801 (for example, the electronic device 101) and other electronic devices (for example, the electronic device 104 or the servers 106) connected through a network. According to an embodiment of the present disclosure, the communication module 820 may include a cellular module 821, a WiFi module 823, a BT module 825, a GPS module 827, an NFC module 828, and a radio frequency (RF) module 829.

The communication module 820 may detect a signal strength of the channel signal. The communication module 820 can detect a signal strength of a channel signal by receiving information on an SNR, an RSSI, or the like.

The cellular module 821 may provide a voice call, a video call, a text service, or an internet service through a telecommunications network (for example, LTE, LTE-A, CDMA, WCDMA, UMTS, WiBro, GSM, and the like). In addition, the cellular module 821 may identify and authenticate the electronic device in the telecommunications network by using a subscriber identification module (for example, the SIM card 824). According to an embodiment of the present disclosure, the cellular module 821 may perform at least some of the functions provided by the AP 810. For example, the cellular module 821 may perform at least some of the multimedia control functions.

According to an embodiment of the present disclosure, the cellular module 821 may include a communication processor (CP). In addition, the cellular module 821 may be implemented by using an SoC, for example. In FIG. 8, the cellular module 821 (for example, the communication processor), the memory 830, or the power management module 895 are elements separate from the AP 810. However, according to an embodiment of the present disclosure, the AP 810 may be configured to include at least some of the above-described elements (for example, the cellular module 821).

According to an embodiment of the present disclosure, the AP 810 or the cellular module 821 (for example, the communication processor) may load instructions or data received from a non-volatile memory connected therewith or at least one of the other elements into a volatile memory, and may process the instructions or data. In addition, the AP 810 or the cellular module 821 may store data which is received from at least one of the other elements or generated by at least one of the other elements in the non-volatile memory.

The WiFi module 823, the BT module 825, the GPS module 827, or the NFC module 828 each may include a processor for processing data received and transmitted through a corresponding module. In FIG. 8, the cellular module 821, the WiFi module 823, the BT module 825, the GPS module 827, and the NFC module 828 are illustrated as separate blocks. However, according to an embodiment of the present disclosure, at least some (for example, two or more) of the cellular module 821, the WiFi module 823, the BT module 825, the GPS module 827, or the NFC module 828 may be included in a single IC or a single IC package. For example, at least some of the processors corresponding to the cellular module 821, the WiFi module 823, the BT module 825, the GPS module 827, and the NFC module 828 (for example, the communication processor corresponding to the cellular module 821 and the WiFi processor corresponding to the WiFi module 823) may be implemented by using a single SoC.

The RF module 829 may transmit and receive data, for example, may transmit and receive an RF signal. The RF module 829 may include a transceiver, a power amplifier module (PAM), a frequency filter, or a low noise amplifier (LNA), for example. In addition, the RF module 829 may further include a part for exchanging electromagnetic waves in free space in wireless communication, for example, a conductor or conductive wire. In FIG. 8, the cellular module 821, the WiFi module 823, the BT module 825, the GPS module 827, and the NFC module 828 share the single RF module 829. However, according to an embodiment of the present disclosure, at least one of the cellular module 821, the WiFi module 823, the BT module 825, the GPS module 827, or the NFC module 828 may transmit and receive an RF signal through a separate RF module.

The SIM card 824 may be inserted into a slot formed at a certain location in the electronic device. The SIM card 824 may include its unique identification information (for example, an integrated circuit card identifier (ICCID)) or subscriber information (for example, international mobile subscriber identity (IMSI)).

The memory 830 (for example, the memory 130) may include an internal memory 832 or an external memory 834. For example, the internal memory 832 may include at least one of a volatile memory (for example, a dynamic random access memory (DRAM), a static RAM (SRAM), a synchronous DRAM (SDRAM), and the like) and a non-volatile memory (for example, an one-time programmable read only memory (OTPROM), a PROM, an erasable programmable ROM (EPROM), an electrically erasable programmable ROM (EEPROM), a mask ROM, a flash ROM, a NAND flash memory, a NOR flash memory, and the like).

According to an embodiment of the present disclosure, the internal memory 832 may be a solid state drive (SSD). The external memory 834 may further include a flash drive, for example, compact flash (CF) drive, secure digital (SD) drive, micro-SD, mini-SD, extreme-digital (xD), a memory stick, and the like. The external memory 834 may be functionally connected with the electronic device 801 through various interfaces. According to an embodiment of the present disclosure, the electronic device 801 may further include a storage device (or a storage medium) such as a hard drive.

The sensor module 840 may measure a physical quantity or detect an operation state of the electronic device 801, and may convert measured or detected information into electric signals. The sensor module 840 may include at least one of a gesture sensor 840A, a gyro sensor 840B, a atmospheric pressure sensor 840C, a magnetic sensor 840D, an acceleration sensor 840E, a grip sensor 840F, a proximity sensor 840G; a color sensor 840H (e.g., Red, Green, Blue (RGB) sensor), a biometric 840I, a temperature/humidity sensor 840J, an illumination sensor 840K, and a Ultraviolet (UV) light sensor 840M. Additionally or alternatively, the sensor module 840 may include an electronic nose (E-nose) sensor, an electromyography (EMG) sensor, an electroencephalogram (EEG) sensor, an electrocardiogram (ECG) sensor, an infrared energy (IR) sensor, an iris sensor, a fingerprint sensor, and the like. The sensor module 840 may further include a control circuit to control at least one sensor included therein.

The input device 850 may include a touch panel 852, a (digital) pen sensor 854, a key 856, or an ultrasonic wave input device 858. The touch panel 852 may recognize a touch input in at least one method of capacitive, resistive, infrared, and ultrasonic methods. In addition, the touch panel 852 may further include a control circuit. In an embodiment of the present disclosure of a capacitive method, the touch panel 852 may recognize not only physical contact but also hovering. The touch panel 852 may further include a tactile layer. In an embodiment of the present disclosure, the touch panel 852 may provide a tactile response to the user.

The (digital) pen sensor 854 may be implemented in the same or similar method as or to the method of receiving a user's touch input or by using a separate detection sheet. The key 856 may include a physical button, an optical key, or a keypad. The ultrasonic wave input device 858 allows the electronic device 801 to detect sound waves through a microphone 888 through an input device generating ultrasonic signals, and is capable of wireless recognition. According to an embodiment of the present disclosure, the electronic device 801 may receive a user input from an external device connected thereto (for example, a computer or a server) by using the communication module 820.

The display 860 (e.g., the display 150) may include a panel 862, a hologram device 864, or a projector 866. For example, the panel 862 may be a liquid crystal display (LCD) or an active matrix organic LED (AM-OLED). For example, the panel 862 may be implemented to be flexible, transparent, or wearable. The panel 862 may be configured as a single module along with the touch panel 852. The hologram device 864 may show a stereoscopic image in the air using the interference of light. The projector 866 may display an image by projecting light onto a screen. The screen may be located internal or external to the electronic device 801. According to an embodiment of the present disclosure, the display 860 may further include a control circuit to control the panel 862, the hologram device 864, or the projector 866.

The interface 870 may include an HDMI 872, a USB 874, an optical interface 876, or a D-subminiature (D-sub) 878. The interface 870 may be included in the communication interface 160 shown in FIG. 1. Additionally or alternatively, the interface 870 may include a Mobile High Definition Link (MHL) interface, a Secure Digital (SD)/Multimedia Card (MMC) interface or Infrared Data Association (IrDA) standard interface.

The audio module 880 may convert a sound wave to an electrical signal and vice versa. For example, at least some elements of the audio module 880 may be included in the input and output interface 140 shown in FIG. 1. The audio module 880 may process sound information which is input or output through a speaker 882, a receiver 884, an earphone 886, or a microphone 888.

The camera module 891 is a device for photographing a still image and a moving image, and, according to an embodiment of the present disclosure, the camera module 891 may include one or more image sensors (for example, a front surface sensor or a rear surface sensor), a lens, an image signal processor (ISP), or a flash (memory) (for example, an LED or a xenon lamp).

The power management module 895 may manage power of the electronic device 801. The power management module 895 may include a power management IC (PMIC), a charging IC, or a battery gauge.

For example, the PMIC may be mounted in an integrated circuit or an SoC semiconductor device. The charging method may be divided into a wire charging method and a wireless charging method. The charging IC may charge a battery and may prevent an overvoltage or overcurrent condition caused by a charger. According to an embodiment of the present disclosure, the charging IC may include a charging IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gauge may measure the remaining battery life of the battery 896, a voltage, a current, or temperature during charging. The battery 896 may store or generate electricity and may supply power to the electronic device 801 by using stored or generated electricity. The battery 896 may include a rechargeable battery or a solar battery.

The indicator 897 may display a certain state of the electronic device 801 or a part of it (for example, the AP 810), for example, a booting state, a message state, or a charging state. The motor 898 may convert an electrical signal into a mechanical vibration. The electronic device 801 may include a processing device (for example, a GPU) for supporting a mobile TV. The processing device for supporting the mobile TV may process media data according to standards such as DMB, digital video broadcasting (DVB), or media flow.

Each of the above-described elements of the electronic device according to various embodiments of the present disclosure may be comprised of one or more components, and the names of the elements may vary according to the kind of the electronic device. The electronic device according to various embodiments of the present disclosure may include at least one of the above-described elements, and some of the elements may be omitted or an additional element may be further included. In addition, some of the elements of the electronic device according to various embodiments of the present disclosure may be combined into a single entity, and may perform the same functions as those of the elements before being combined.

Figure 9:
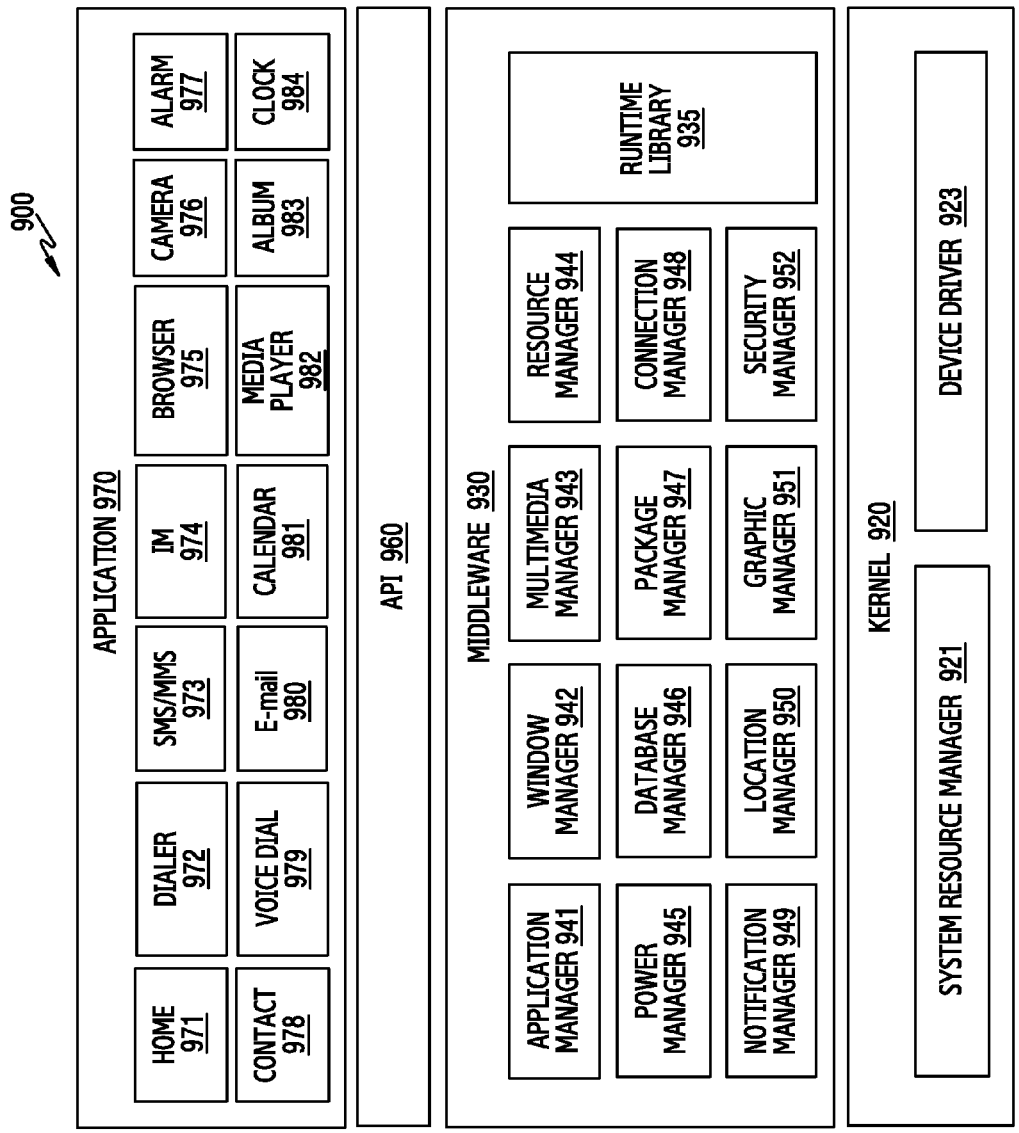
FIG. 9 is a block diagram of a program module according to an embodiment of the present disclosure.

FIG. 9 is a block diagram illustrating a program module 900 according to an embodiment.

According to an embodiment of the present disclosure, the program module 900, (for example, application 134) may include an operating system (OS) for controlling a resource relating to an electronic device, (for example, the electronic device 101) and/or various applications running on the OS. The operating system may be, for example, Android, iOS, Windows®, Symbian, Tizen™, Bada, or the like.

The program module 900 may include a kernel 920, a middleware 930, an application programming interface (API) 960 and/or an application 970. At least some or part of the program module 900 may be preloaded on the electronic device or downloaded from a server (for example, the server 106).

The kernel 920 (for example, the kernel 131 illustrated in FIG. 1) may include, for example, a system resource manager 921 or a device driver 923. The system resource manager 921 may control, allocate, or collect system resources. According to an embodiment of the present disclosure, the system resource manager 921 may include a process management unit, a memory management unit, or a file system management unit. The device driver 923 may include, for example, a display driver, a camera driver, a Bluetooth driver, a shared-memory driver, a USB driver, a keypad driver, a WiFi driver, an audio driver, or an inter-process communication (IPC) driver.

The middleware 930 may provide, for example, a function required by the application 970 in common, or may provide various functions to the application 970 through the API 960 so that the application 970 may efficiently use limited system resources of an electronic device. According to an embodiment of the present disclosure, the middleware 930 (for example, the middleware 132) may include at least one of a runtime library 935, an application manager 941, a window manager 942, a multimedia manager 943, a resource manager 944, a power manager 945, a database manager 946, a package manager 947, a connection manager 948, a notification manager 949, a location manager 950, a graphic manager 951, or a security manager 952.

The runtime library 935 may include, for example, a library module used by a complier, in order to add a new function through a programming language during the execution of the application 970. The run time library 935 may perform input/output management, memory management, or a function for an arithmetic function.

The application manager 941 may manage, for example, a life cycle of at least one application among the application

970. The window manager 942 may manage graphical user interface (GUI) resources used on a screen. The multimedia manager 943 may check a format required for reproducing various media files and perform an encoding or a decoding of a media file by using a codec suitable for the corresponding format. The resource manager 944 may manage resources, such as a source code, a memory, a storage space, and/or the like of at least one of the application 970.

The power manager 945 may operate together with, for example, a basic input/output system (BIOS) to manage a battery or power, and may provide power information required for the operation of the electronic device. The database manager 946 may generate, search for, or change a database to be used by at least one of the application 970. The package manager 947 may manage an installation or an update of an application distributed in the form of a package file.

The connection manager 948 may manage, for example, a wireless connection such as WiFi or Bluetooth. The notification manager 949 may display or notify an event such as a received message, an appointment, and proximity notification in a manner of not disturbing a user. The location manager 950 may manage location information of the electronic device. The graphic manager 951 may manage a graphic effect to be provided to a user or a user interface relating to the graphic effect. The security manager 952 may provide all security functions required for system security or user authentication. According to an embodiment of the present disclosure, when the electronic device (for example, the electronic device 101) includes a telephone call function, the middleware 930 may further include a telephony manager for managing a voice or video call function of the electronic device.

The middleware 930 may include a middleware module for forming a combination of various functions of the aforementioned components. The middleware 930 may provide modules specialized according to types of operating systems in order to provide differentiated functions. Further, the middleware 930 may dynamically delete some of the conventional components or add new components.

The API 960 (for example, the API 133), for example, a set of API programming functions, may be provided as a different configuration according to an operating system. For example, in the case of Android or iOS, one API set may be provided with respect to each platform, and, in the case of Tizen™, two or more API sets may be provided with respect to each platform.

The application 970 (for example, the application 134) may include one or more applications capable of providing a function, such as a home application 971, a dialer 972, a SMS/MMS 973, an instant message (IM) 974, a browser 975, a camera 976, an alarm 977, a contact 978, a voice dial 979, an e-mail 980, a calendar 981, a media player 982, an album 983, or a clock 984 and a health care application (for example, measuring momentum or blood glucose contents), or providing environment information (for example, providing atmospheric pressure, humidity, or temperature information).

According to an embodiment of the present disclosure, the application 970 may include an application supporting information exchange (hereinafter, for the sake of convenience, referred to as "information exchange application") between the electronic device 101 and an external electronic device 102 or 104. The information exchange application may include, for example, a notification relay application for transmitting specific information to the external electronic device, or a device management application for managing the external electronic device.

For example, the notification relay application may include a function of transferring, to an external electronic device 102 or 104, notification information generated from other applications of the electronic device (for example, an SMS/MMS application, an e-mail application, a health management application, or an environmental information application). Further, the notification relay application may receive notification information from, for example, an external electronic device and provide the received notification information to a user. The device management application may manage (for example, install, delete, or update), for example, at least one function of an external electronic device 104 communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the application 970 may include an application (for example, a health care application) designated according to attributes (for example, attributes of the electronic device such as the type of electronic device which corresponds to a mobile medical device) of an external electronic device 102 or 104. According to an embodiment of the present disclosure, the application 970 may include an application received from an external device (for example, the server 106 or the electronic device 102 or 104). According to an embodiment of the present disclosure, the application 970 may include a preloaded application or a third party application which can be downloaded from a server. Names of the components of the program module 900 according to the above described embodiments of the present disclosure may vary according to a type of an operating system.

According to an embodiment of the present disclosure, at least a part of the programming module 900 may be implemented in software, firmware, hardware, or a combination thereof. At least some of the programming module 900 may be implemented (for example, executed) by, for example, the processor (for example, the AP 810). At least some of the programming module 900 may include, for example, a module, program, routine, sets of instructions, or process for performing one or more functions.

The term "module" as used herein may, for example, refer to a unit including one of hardware, software, and firmware or a combination thereof. The term "module" may be interchangeably used with, for example, the term "unit," "logic," "logical block," "component," or "circuit." The term "module" may refer to the smallest unit of an integrated component or a part thereof. The term "module" may refer to the smallest unit that performs one or more functions or a part thereof. The term "module" may refer to a device that is mechanically or electronically implemented. For example, the term "module" according to the present disclosure may include at least one of an application specific IC (ASIC), a field-programmable gate array (FPGA), and a programmable-logic device (PLD) for performing operations which are known or will be developed.

According to an embodiment of the present disclosure, at least some of the devices (for example, modules or functions thereof) or the method (for example, operations) according to the present disclosure may be implemented by a command stored in a non-transitory computer-readable storage medium in a programming module form. The command or instruction, when executed by a processor (e.g., the processor 120), may cause the one or more processors to execute the function corresponding to the instruction. The non-transitory computer-readable storage medium may be, for example, the memory 130.

The non-transitory computer readable recoding medium may include a hard disk, a floppy disk, magnetic media (e.g., a magnetic tape), optical media (e.g., a compact disk ROM (CD-ROM) and a DVD), magneto-optical media (e.g., a floptical disk), a hardware device (e.g., a ROM, a RAM, a flash memory), and the like. In addition, the program instructions may include high level language code, which can be executed in a computer by using an interpreter, as well as machine code generated by a compiler. The aforementioned hardware device may be configured to operate as one or more software modules in order to perform the operation of the present disclosure, and vice versa.

A storage medium is provided for storing commands according to an embodiment of the present disclosure, wherein the commands are configured to perform at least one operation by at least one processor when the commands are executed by the at least one processor, wherein the at least one operation may include identifying a condition for updating a channel; comparing the condition for updating the channel with a predetermined condition; determining whether to update the channel on the basis of a result of the comparison; and displaying information relating to the updating of the channel.

Any of the modules or programming modules according to an embodiment of the present disclosure may include at least one of the above described elements, exclude some of the elements, or further include other additional elements. The operations performed by the modules, programming module, or other elements according to an embodiment of the present disclosure may be executed in a sequential, parallel, repetitive, or heuristic manner. Further, some operations may be executed according to another order or may be omitted, or other operations may be added.

Various embodiments disclosed herein are provided merely to easily describe technical details of the present disclosure and to facilitate understanding of the present disclosure, but are not intended to limit the scope of the present disclosure. Therefore, it should be construed that all modifications and changes or modified and changed forms based on the present disclosure fall within the scope of the present disclosure, as defined by the appended claims and their equivalents.

What is claimed is:

1. An electronic device, comprising:
   a display; and
   a processor configured to control the display,
   wherein the processor is further configured to:
   detect a channel signal intensity,
   determine whether the detected channel signal intensity is lower than a reference value,
   in response to determining that the detected channel signal intensity is lower than the reference value, detect a location of the electronic device,
   determine whether an area is changed based on the detected location of the electronic device, wherein the electronic device is in the area,
   in response to determining that the area is changed based on the detected location of the electronic device, display a notification indicating the area is changed,
   determine whether a channel list of the changed area is stored,
   if the channel list of the changed area is stored, determine whether a first channel exists in the channel list of the changed area, wherein the first channel corresponds to a second channel which is displayed currently,
   in response to determining that the first channel does not exist in the channel list of the changed area, display the channel list of the changed area,
   in response to determining that the first channel exists in the channel list of the changed area, display the first channel corresponding to the second channel, and
   if the channel list of the changed area is not stored, update the channel list of the changed area.

2. The electronic device of claim 1, wherein a condition for updating the channel list includes at least one of an execution of a function, or a channel change.

3. The electronic device of claim 2, wherein the processor is further configured to detect a change of the location of the electronic device based on address information.

4. The electronic device of claim 3, wherein the address information includes at least one address area, and the processor is further configured to determine the change of the location of the electronic device while varying the address area according to a specification of a country or a television (TV).

5. The electronic device of claim 1, wherein information relating to updating the channel list includes one piece of information among information indicating whether a channel scan has been performed or a change of the location of the electronic device.

6. The electronic device of claim 1, wherein the processor is further configured to switch a reproducing channel to a channel corresponding to a changed location when the location of the electronic device is changed so that a channel is updated.

7. The electronic device of claim 6, wherein the processor is further configured to maintain a current channel list when a user indicates that the channel list is not to be updated.

8. A method of an electronic device, comprising:
   detecting, on a processor, a channel signal intensity,
   determining, on the processor, whether the detected channel signal intensity is lower than a reference value,
   in response to determining that the detected channel signal intensity is lower than the reference value, detecting, on the processor, a location of the electronic device,
   determining, on the processor, whether an area is changed based on the detected location of the electronic device, wherein the electronic device is in the area,
   in response to determining that the area is changed based on the detected location of the electronic device, displaying, on a display, a notification indicating the area is changed,
   determining, on the processor, whether a channel list of the changed area is stored,
   if the channel list of the changed area is stored, determining whether a first channel exists in the channel list of the changed area, wherein the first channel corresponds to a second channel which is displayed currently,
   in response to determining that the first channel does not exist in the channel list of the changed area, displaying, on the display, the channel list corresponding to the changed area,
   in response to determining that the first channel exists in the channel list of the changed area, displaying, on the display, the first channel corresponding to the second channel, and if the channel list of the changed area is not stored, updating, by the processor, the channel list of the changed area.

9. The method of claim 8, wherein a condition for updating the channel includes at least one of an execution of a function, and a channel change.

10. The method of claim 9, wherein determining whether the area is changed includes comparing a change of the location of the electronic device based on address information.

11. The method of claim 10, wherein the address information includes at least one address area, and detecting the location change includes determining the change of the location of the electronic device while varying the address area according to a specification of a country or a television (TV).

12. The method of claim 8, wherein information relating to updating the channel list includes at least one piece of information among information indicating whether a channel scan has been performed or a change of the location of the electronic device.

13. The method of claim 8, further comprising switching a channel, which is being reproduced, to a channel corresponding to a changed location when the location of the electronic device is changed so that a channel is updated.

14. The method of claim 13, further comprising maintaining a current channel list when a user indicates that the channel list is not to be updated.

* * * * *